United States Patent
Shinohara

(10) Patent No.: US 11,032,446 B2
(45) Date of Patent: Jun. 8, 2021

(54) IMAGE PROCESSING DEVICE, IMAGE PROCESSING METHOD, AND PROGRAM FOR CORRECTING COLOR IN AN IMAGE

(71) Applicant: SONY INTERACTIVE ENTERTAINMENT INC., Tokyo (JP)

(72) Inventor: Takayuki Shinohara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 61 days.

(21) Appl. No.: 16/346,930

(22) PCT Filed: Nov. 13, 2017

(86) PCT No.: PCT/JP2017/040754
§ 371 (c)(1),
(2) Date: May 2, 2019

(87) PCT Pub. No.: WO2018/092715
PCT Pub. Date: May 24, 2018

(65) Prior Publication Data
US 2020/0059573 A1 Feb. 20, 2020

(30) Foreign Application Priority Data

Nov. 17, 2016 (JP) .............................. JP2016-224043

(51) Int. Cl.
*H04N 1/60* (2006.01)
*H04N 1/407* (2006.01)
(Continued)

(52) U.S. Cl.
CPC ............ *H04N 1/6027* (2013.01); *G06T 5/001* (2013.01); *G09G 5/02* (2013.01); *H04N 1/407* (2013.01);
(Continued)

(58) Field of Classification Search
CPC ...... H04N 1/6027; H04N 1/407; H04N 5/367; G06T 5/001; G06T 2207/10024; G09G 5/02; G09G 2320/0242; G09G 2360/16
See application file for complete search history.

(56) References Cited

U.S. PATENT DOCUMENTS

| 7,978,909 B2 * | 7/2011 | Umeda | G06T 7/13 |
| | | | 382/162 |
| 9,483,844 B2 * | 11/2016 | Wiemker | G06F 19/321 |

(Continued)

FOREIGN PATENT DOCUMENTS

| JP | 11-178011 A | 7/1999 |
| JP | 2011-530857 A | 12/2011 |
| WO | 2010/016820 A1 | 2/2010 |

OTHER PUBLICATIONS

International Search Report and Written Opinion dated Feb. 6, 2018, from International Application No. PCT/JP2017/040754, 6 sheets.

(Continued)

*Primary Examiner* — Ming Y Hon
(74) *Attorney, Agent, or Firm* — Katten Muchin Rosenman LLP

(57) ABSTRACT

To prevent any variation of the grayscale to be originally present from becoming unclear, diminishing banding that is generated when an image including a gradation is displayed. An image processing device obtains image data of an original image including plural pixels, obtains an evaluation value that represents the possibility of the generation of the banding on the basis of the color distribution of a noted area including a target pixel that is any one of the plural pixels, produces an intermediate image of which the color of the target pixel is corrected on the basis of the evaluation value, and causes a corrected image to be output on the basis of the produced intermediate image. A correction amount of the color of the target pixel is varied in accordance with the evaluation value, in the correction of the color.

10 Claims, 9 Drawing Sheets

(51) Int. Cl.
*H04N 5/367* (2011.01)
*G06T 5/00* (2006.01)
*G09G 5/02* (2006.01)

(52) U.S. Cl.
CPC ... *H04N 5/367* (2013.01); *G06T 2207/10024* (2013.01)

(56) References Cited

U.S. PATENT DOCUMENTS

| | | | |
|---|---|---|---|
| 2008/0007785 A1* | 1/2008 | Hashii | H04N 1/4072 358/3.01 |
| 2010/0119163 A1* | 5/2010 | Inoue | H04N 5/21 382/224 |
| 2010/0135575 A1* | 6/2010 | Guo | G06T 7/11 382/164 |
| 2011/0129020 A1* | 6/2011 | Li | H04N 19/61 375/240.29 |
| 2017/0347126 A1* | 11/2017 | Shoa Hassani Lashdan | H04N 19/192 |
| 2019/0080437 A1* | 3/2019 | Shivakumar | H04N 1/40 |

OTHER PUBLICATIONS

International Preliminary Report on Patentability dated May 21, 2019, from International Application No. PCT/JP2017/040754, 11 sheets.

\* cited by examiner

FIG.10
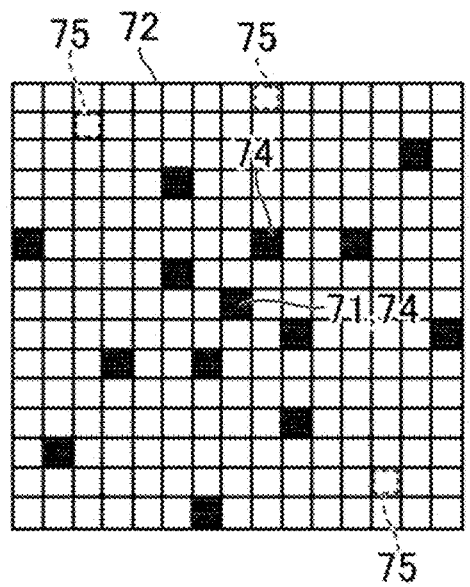
FIG.11
| DISTANCE OF COLOR | 0 | 1 | 2 | 3 | 4 | 5 | 6 |
|---|---|---|---|---|---|---|---|
| SCORE ELEMENT | 10 | 10 | 9 | 6 | 3 | 2 | 1 |
FIG.12
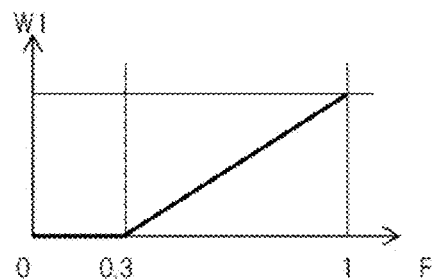
FIG.13
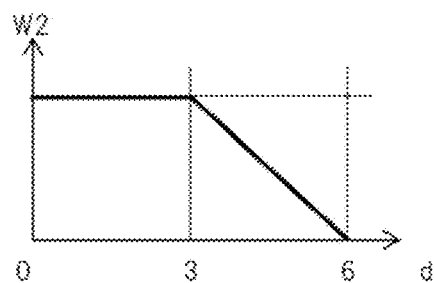

IMAGE PROCESSING DEVICE, IMAGE PROCESSING METHOD, AND PROGRAM FOR CORRECTING COLOR IN AN IMAGE

TECHNICAL FIELD

The present invention relates to an image processing device, an image processing method, and a program.

BACKGROUND ART

It is generally conducted to cause a display such as a head-mounted display or a television to display thereon an image produced from image data.

It is known that a phenomenon of a what-is-called banding is generated in the case where an image including a gradation whose color is smoothly varied like, for example, the sky is displayed. The banding is a problem that arises when an image is displayed in an area of the gradation whose color is originally varied smoothly, and is a phenomenon for band-like things to be seen.

SUMMARY

Technical Problem

It can be considered that a smoothing process is performed to diminish the banding while the variation of the grayscale to be originally present in the area having therein no gradation becomes unclear.

The present invention was conceived in view of the above circumstances and an object thereof is to provide a technique of preventing any variation of the grayscale to be originally present from becoming unclear, diminishing the banding generated when an image including a gradation is displayed.

Solution to Problem

To solve the above problem, an image processing device according to the present invention includes image data obtaining means that obtains image data of an original image including plural pixels, evaluation value obtaining means that obtains an evaluation value that represents the possibility of generation of the banding on the basis of the color distribution in a noted area including a target pixel that is any one of the plural pixels, correcting means that produces an intermediate image of which the color of the target pixel is corrected on the basis of the evaluation value, and image output means that causes a corrected image to be output on the basis of the produced intermediate image. The correcting means varies a correction amount of the color of the target pixel in accordance with the evaluation value.

An image processing method according to the present invention includes a step of obtaining image data of an original image including plural pixels, a step of obtaining an evaluation value that represents the possibility of generation of the banding on the basis of the color distribution in a noted area including a target pixel that is any one of the plural pixels, a step of producing an intermediate image of which the color of the target pixel is corrected on the basis of the evaluation value, and a step of causing a corrected image to be output on the basis of the produced intermediate image. At the step of producing the intermediate image, a correction amount of the color of the target pixel is varied in accordance with the evaluation value.

A program according to the present invention causes a computer to function as obtaining means that obtains image data of an original image including plural pixels, evaluation value obtaining means that obtains an evaluation value that represents the possibility of generation of the banding on the basis of the color distribution in a noted area including a target pixel that is any one of the plural pixels, correcting means that produces an intermediate image of which the color of the target pixel is corrected on the basis of the evaluation value, and image output means that causes the corrected image to be output on the basis of the produced intermediate image. The correcting means varies a correction amount of the color of the target pixel in accordance with the evaluation value.

According to the present invention, variation of the grayscale to be originally present is prevented from becoming unclear, diminishing the banding generated when an image including a gradation is displayed.

In a form of the present invention, the correcting means does not need to correct the color of the target pixel in the case where it is determined that the possibility of generation of the banding is low, on the basis of a comparison between the evaluation value and a predetermined threshold value.

In a form of the present invention, the correcting means may correct the color of the target pixel in the case where it is determined that the possibility of generation of the banding is high, on the basis of the comparison between the evaluation value and a predetermined threshold value.

In a form of the present invention, the correcting means may correct the color of the target pixel such that the correction amount becomes larger as a difference between the evaluation value and a predetermined threshold value become larger in the case where the correcting means corrects the color of the target pixel.

In a form of the present invention, the evaluation value obtaining means may obtain the evaluation value that represents flatness of grayscale values representing the color of the noted area.

In a form of the present invention, the correcting means may correct such that the grayscale values of the target pixel become close to an average of the grayscale values of the plural pixels present in the noted area.

In a form of the present invention, the correcting means may calculate the evaluation value on the basis of a difference between the average of the grayscale values of plural pixels present in the noted area and the grayscale values of the target pixel.

In a form of the present invention, the evaluation value obtaining means may calculate the evaluation value on the basis of the grayscale values of plural pixels that are plural pixels present in the noted area and that are each not adjacent to each other.

BRIEF DESCRIPTION OF DRAWINGS

FIG. 10 is a diagram depicting an example of a set N of pixels.

FIG. 11 is a diagram depicting an example of a table used in calculation of a score.

FIG. 12 is a graph depicting an example of the relation between an evaluation value F of flatness and a weight W1.

FIG. 13 is a graph depicting an example of the relation between a distance d and a weight W2.

DESCRIPTION OF EMBODIMENT

Figure 1:
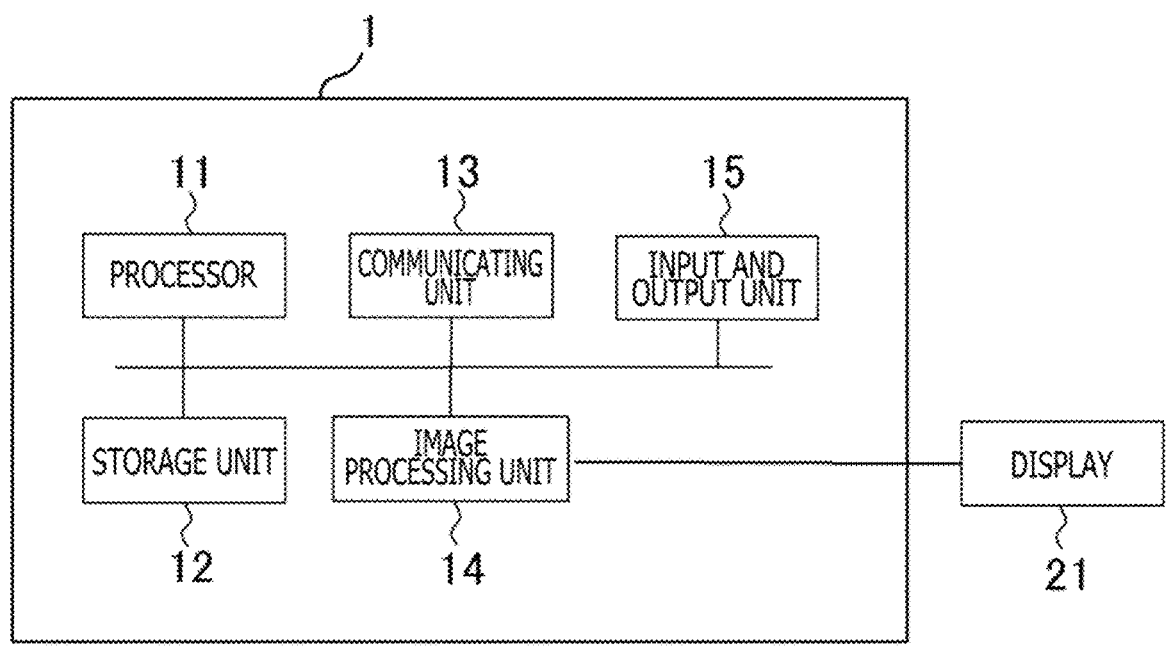
FIG. 1 is a diagram depicting an example of a hardware configuration of an image processing device according to an embodiment of the present invention.

An embodiment of the present invention will be described below with reference to the drawings. Constituent elements having the same function of the constituent elements appearing in the description are given the same reference numeral and will not again be described.

An image processing device 1 that diminishes banding for an image of one frame produced by decoding moving image data will be described in the present embodiment while this is only an example and the present invention is also applicable to, for example, a still image.

FIG. 1 is a diagram depicting an example of a hardware configuration of the image processing device 1 according to the embodiment of the present invention. The image processing device 1 is a personal computer, a home-use game machine, a tablet terminal, or the like. The image processing device 1 includes a processor 11, a storage unit 12, a communicating unit 13, a graphics processing unit (GPU) 14, and an input and output unit 15.

The processor 11 operates in accordance with programs stored in the storage unit 12 and controls the communicating unit 13, the GPU 14, the input and output unit 15, and the like. In addition, the programs may be those that are provided being stored in a computer-readable storage medium such as a flash memory, or may be those that are provided through a network such as the Internet.

The storage unit 12 includes a memory element such as a dynamic random access memory (DRAM) or a flash memory. The storage unit 12 stores therein the programs. The storage unit 12 furthermore stores therein pieces of information input from the processor 11, the communicating unit 13, and the like, and computing results. The storage unit 12 may further include an external storage device such as a hard disc.

The communicating unit 13 includes an integrated circuit that constitutes a wired local area network (LAN) or a wireless LAN, a connector, an antenna, and the like. The communicating unit 13 has a function of communicating with another device through a network. The communicating unit 13 inputs information received from another device into the processor 11 or the storage unit 12, and transmits the information to another device, on the basis of control by the processor 11.

The image processing unit 14 includes a what-is-called GPU, a frame buffer memory, and a display control circuit.

The display control circuit produces a display signal to be output to a display 21. The display 21 displays thereon an image represented by the display signal output by the image processing unit 14. The display 21 may be an external display, may be incorporated in the image processing device 1, or may be a head-mounted display.

The input and output unit 15 includes a circuit that obtains an input from hardware that detects an operation by a user, and a circuit that outputs a sound and the like. The input and output unit 15 obtains an input signal from an input device such as a keyboard or a controller, and inputs information produced by converting the input signal, into the processor 11 and the storage unit 12.

Figure 2:
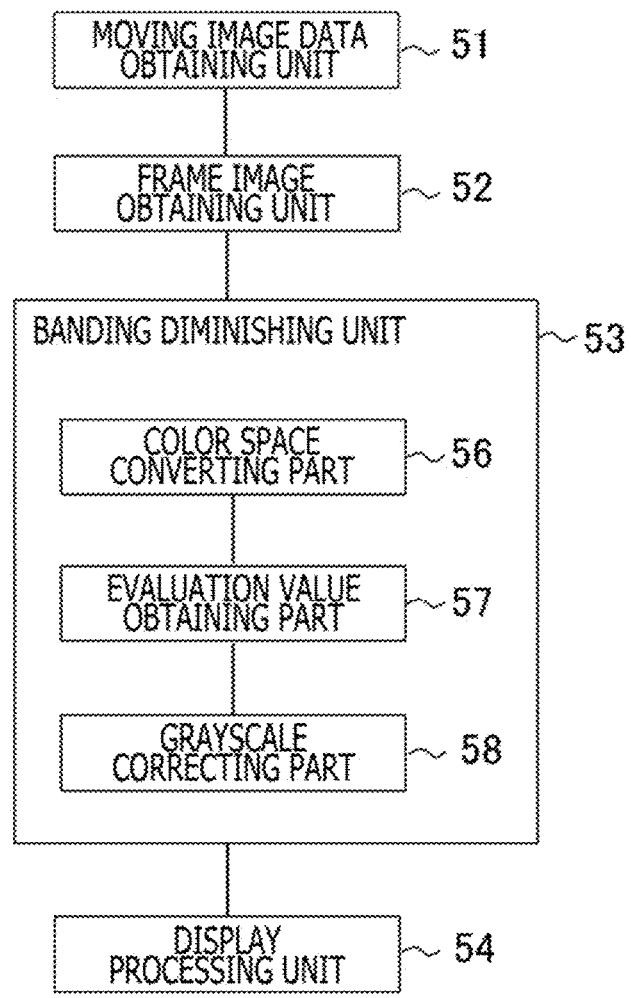
FIG. 2 is a block diagram depicting the functions realized by the image processing device.

The functions and processes realized by the image processing device 1 will be described below. FIG. 2 is a block diagram depicting the functions realized by the image processing device 1. The image processing device 1 includes a moving image data obtaining unit 51, a frame image obtaining unit 52, a banding diminishing unit 53, and a display processing unit 54, regarding the functions thereof. The banding diminishing unit 53 includes a color space converting part 56, an evaluation value obtaining part 57, a grayscale correcting part 58, regarding the functions thereof.

The moving image data obtaining unit 51 is realized mainly by the fact that the processor 11 performs the programs stored in the storage unit 12 and obtains information from the storage unit 12 or through the communicating unit 13. The frame image obtaining unit 52 and the banding diminishing unit 53 are each realized mainly by the fact that the processor 11 and the GPU included in the image processing unit 14 execute the programs stored in the storage unit 12, process the information stored in the storage unit 12 and the like, and store the processing results in the storage unit 12 and the frame buffer. The display processing unit 54 is realized mainly by a display control circuit of the image processing unit 14.

The moving image data obtaining unit 51 obtains the moving image data stored in the storage unit 12 or another device. The moving image data may be data encoded by a known codec for moving image compression.

The frame image obtaining unit 52 decodes the obtained moving image data and obtains the image data of the image of the current frame. This image includes plural pixels arranged in a matrix, and the image data includes information indicating the color of each of the pixels. The information indicating the color may be, for example, information in the YUV format or may be information in the RGB format. In the following, the description will be made assuming that the image data includes color information regarding each of the pixels in the YUV format. The frame image obtaining unit 52 may obtain data of a still image stored in the storage unit 12 or data of a still image received through the network, instead of decoding the moving image data.

The banding diminishing unit 53 corrects the image such that the banding phenomenon is diminished in the image represented by the image data, and outputs the image data of an intermediate image that is the corrected image to the memory.

Figure 3:
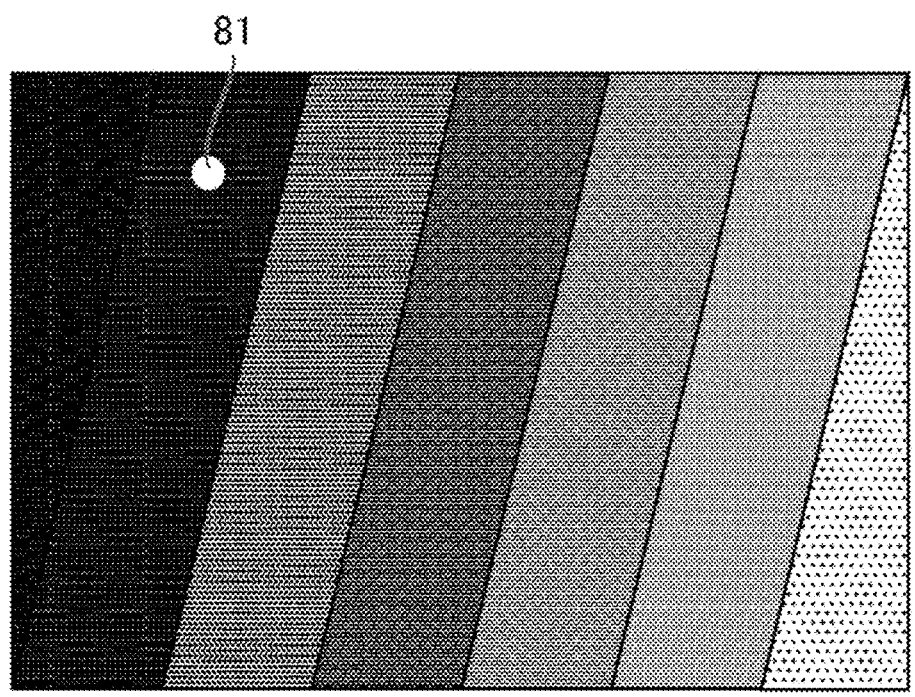
FIG. 3 is a diagram schematically depicting an image that includes banding.

FIG. 3 is a diagram schematically depicting an image that includes the banding. The banding is a phenomenon for band-like things to be seen in an image of a gradation whose grayscale originally varies smoothly. When a strong banding phenomenon is generated, a color different from the original color (a false color) may visually be recognized. In the example of FIG. 3, the image includes a gradation area having the banding phenomenon generated therein and a non-gradation area 81 that is not any gradation. The gradation area is, for example, a predawn sky and the non-gradation area 81 is, for example, a star in the sky.

The banding phenomenon is generated due to quantization during the shooting, correction of the color tone and the grayscale during the editing, quantization in the encoding, the conversion of the color space, and the like. The banding phenomenon is generated not only in the case where the number of the grayscale levels visually recognizable by a human is simply larger than the number of the grayscale levels representable by the display 21 or the image data but also in the case where the number of the substantially representable grayscale levels becomes smaller than the number of the grayscale levels representable by the image data due to the processing performed for the image data.

The color space converting part 56 included in the banding diminishing unit 53 converts color information in the YUV format into color information in the RGB format. The color information in the YUV format is represented by three values of Y, Cb, and Cr. The color information in the RGB format is represented by three values of R, G, and B. In the present embodiment, Y, Cb, and Cr are each an integer value and R, G, and B output by the color space converting part 56 by the conversion are each a real-number value in the floating decimal point format. The value of each of R, G, and B will hereinafter be referred to as "grayscale value." The color space converting part 56 may convert the color information in the YUV format into the color information in the RGB format on the basis of a known mathematical equation.

Figure 4:
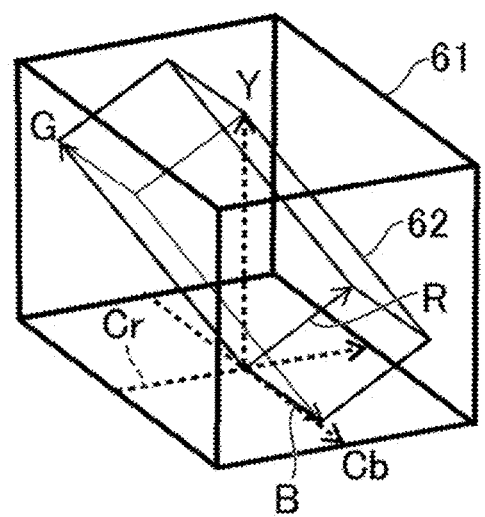
FIG. 4 is a diagram explaining the relation between a YUV color space and an RGB color space.

FIG. 4 is a diagram explaining the relation between a YUV color space 61 and an RGB color space 62. The YUV color space 61 represents the range of colors representable by the values of Y, Cb, and Cr in the YUV format, and the RGB color space 62 represents the range of colors representable by the values of R, G, and B in the RGB format. As depicted in FIG. 4, the RGB color space 62 can be corresponded to a part of the range of the YUV color space 61. On the other hand, the ranges of the values in the YUV format (such as, for example, $16 \leq Y \leq 235$, $16 \leq Cb$, and $Cr \leq 240$) are generally narrower than the ranges of the values in the RGB format (such as, for example, $0 \leq R$, G, and $B \leq 255$) and, in the case where these are represented by integer values, even the colors each adjacent to each other in the YUV color space 61 may be represented as colors distant from each other in the RGB color space 62. This phenomenon is one of the factors that generate the banding.

The evaluation value obtaining part 57 calculates the evaluation value that represents the possibility of the generation of the banding on the basis of the color distribution of a noted area 72 including a target pixel 71 that is any one of the plural pixels included in the image. In this case, the evaluation value obtaining part 57 calculates the evaluation value for each of the pixels included in the image by changing the target pixel 71. The evaluation value is the value representing the flatness of the variation of the grayscale value on a plane. The details of the calculation of the evaluation value will be described later.

The grayscale correcting part 58 produces the image data of the intermediate image of which the color of the target pixel 71 is corrected, on the basis of the calculated evaluation value. The grayscale correcting part 58 causes the correction amount of the color of the target pixel 71 to vary corresponding to the calculated evaluation value. In this case, the intermediate image may be corrected for its plural pixels on the basis of the change of the target pixel 71.

In the case where it is determined that the possibility of the generation of the banding is low on the basis of a comparison between the evaluation value and a determination threshold value determined in advance, the grayscale correcting part 58 does not correct the color of the target pixel 71. On the other hand, in the case where it is determined that the possibility of the generation of the banding is high on the basis of the comparison between the evaluation value and the determination threshold value determined in advance, the grayscale correcting part 58 corrects the color of the target pixel 71. In the case where the grayscale correcting part 58 corrects the color of the target pixel 71, the grayscale correcting part 58 corrects the color of the target pixel 71 such that the correction amount becomes larger as the difference between the evaluation value and the determination threshold value becomes larger.

The grayscale correcting part 58 corrects such that the grayscale values of R, G, and B of the target pixel 71 respectively become close to the averages of the R, G, and B grayscale values of the plural pixels present in the noted area 72. On the other hand, the grayscale correcting part 58 may correct the color of each of the pixels concurrently using dithering.

The display processing unit 54 causes the display 21 to display thereon the corrected image on the basis of the image data of the intermediate image.

Figure 5:
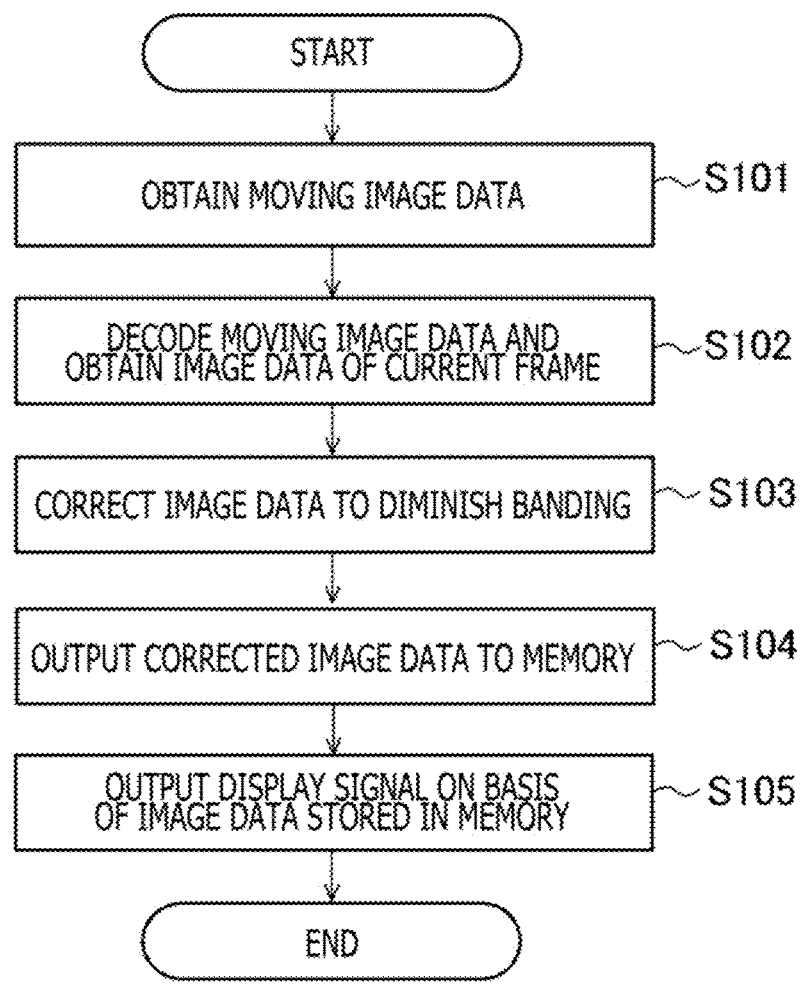
FIG. 5 is a flowchart sketchily depicting the processes performed by the image processing device.

The processes performed by the image processing device 1 will be described next with reference to the drawings. FIG. 5 is a flowchart sketchily depicting the processes performed by the image processing device 1.

The moving image data obtaining unit 51 first obtains the moving image data stored in the storage unit 12 or another device (step S101). The frame image obtaining unit 52 next decodes the obtained moving image data and obtains the image data of the image of the current frame (step S102).

The banding diminishing part 53 corrects an image represented by the image data such that any banding is diminished in this image (step S103). The corrected image will hereinafter be referred to as "intermediate image."

Figure 6:
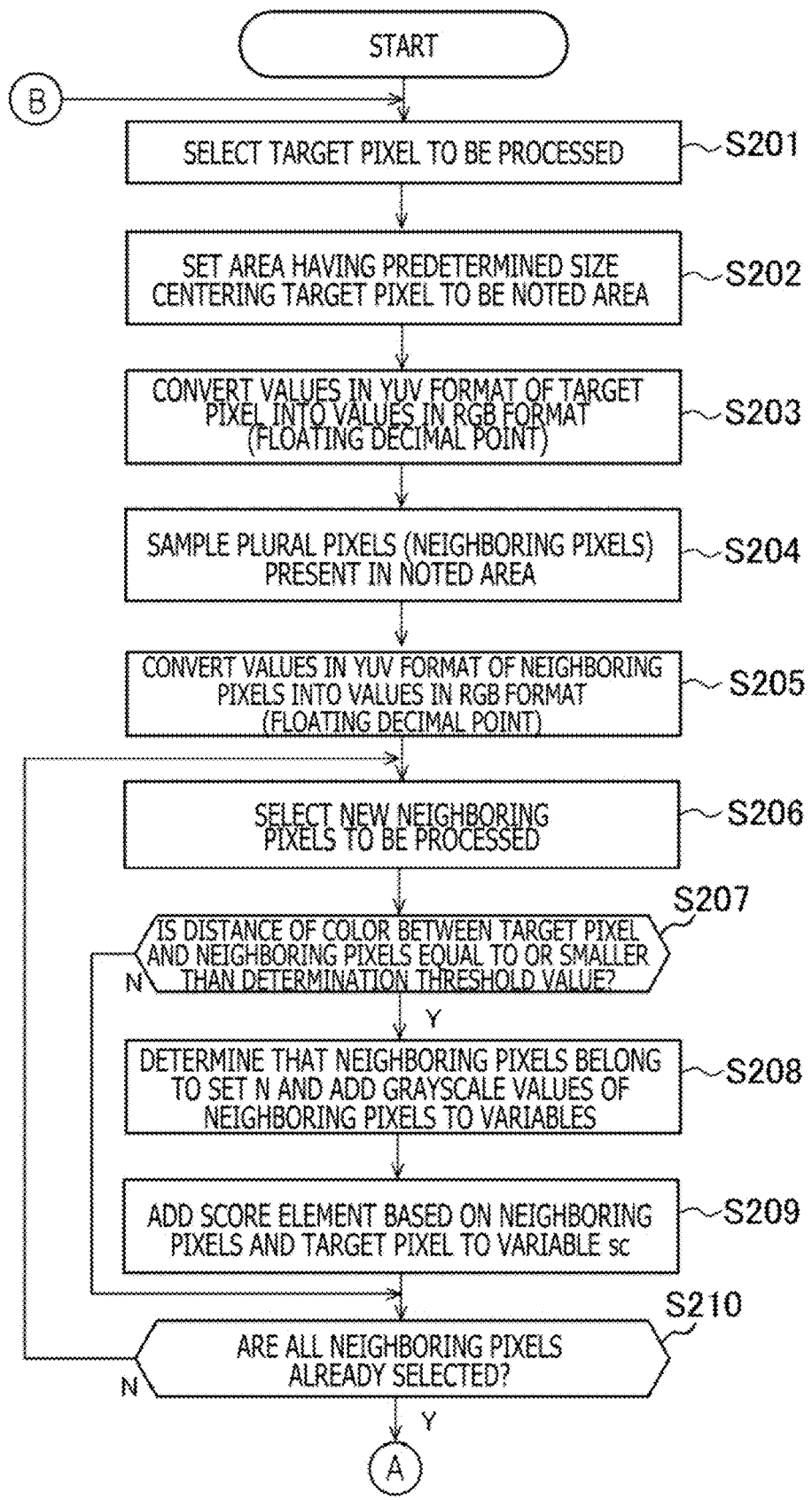
FIG. 6 is a flowchart depicting processes performed by a banding diminishing unit.
Figure 7:
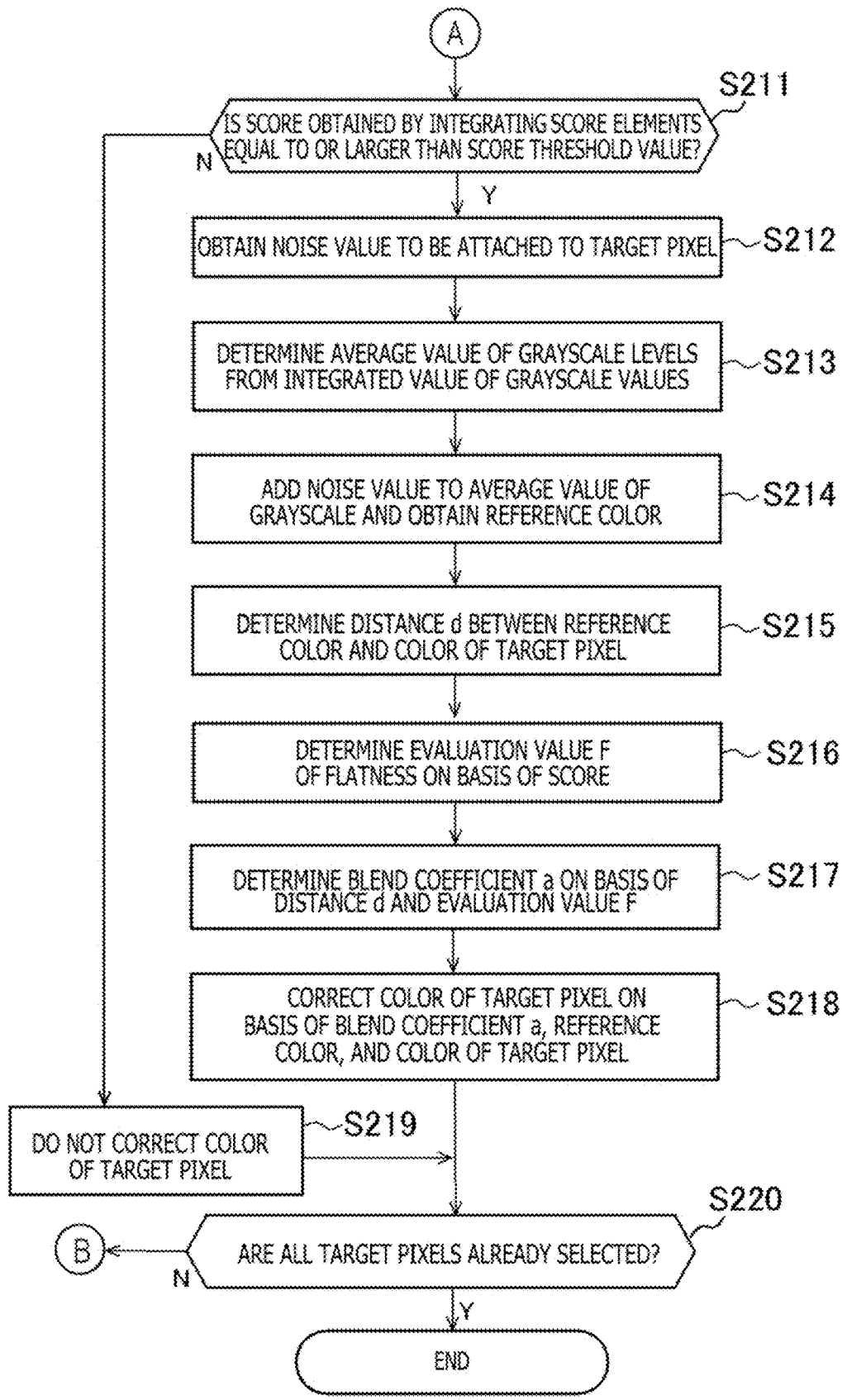
FIG. 7 is a flowchart depicting processes performed by the banding diminishing unit.

The process at step S103 will more specifically be described next. FIG. 6 and FIG. 7 are flowcharts depicting the processes performed by the banding diminishing unit 53. FIG. 6 and FIG. 7 are flowcharts more specifically explaining the process performed at step S103. The processes depicted in FIG. 6 and FIG. 7 are mainly performed by a shader of the GPU in the present embodiment while the processes may be performed by the processor 11.

The banding diminishing unit 53 first selects the target pixel 71 to be the target of the process (step S201). More specifically, for example, the banding diminishing unit 53 may repeat an operation in which the banding diminishing unit 53 selects the pixels included in the upper end scanning line of the pixels in the matrix sequentially from the left end toward the right as the target pixel 71 and, when the selected pixel reaches the pixel at the right end, selects the pixels included in the next line sequentially from the left end as the target pixel 71. The banding diminishing unit 53 may sequentially select all the pixels included in the image as the target pixel 71 in another order determined in advance. The banding diminishing unit 53 may select plural pixels at one time as the target pixels 71 and may perform the processes at and after step S202 in parallel for each of the selected pixels. For facilitation of the description, the processes performed for one target pixel 71 will be described below.

Figure 8:
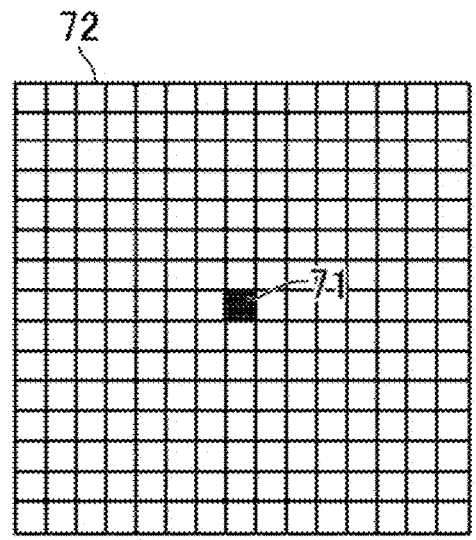
FIG. 8 is a diagram depicting an example of a target pixel and a noted area.

When the target pixel 71 is selected, the banding diminishing unit 53 sets an area having a predetermined size, centering the target pixel 71 to be the noted area 72 (step S202). The noted area 72 includes some of the plural pixels that are included in the image. FIG. 8 is a diagram depicting an example of the target pixel 71 and the noted area 72. An area of 15×15 centering the target pixel 71 is set to be the noted area 72 in the example of FIG. 8 while the size of the noted area 72 may be different therefrom. The noted area 72 may include pixels each different from the pixels that are each directly adjacent to the target pixel 71.

The color space converting part 56 converts the values of Y, Cb, and Cr in the YUV format of the target pixel 71 into the grayscale values of R, G, and B in the RGB format (step S203). In the present embodiment, the values of Y, Cb, and Cr in the YUV format are each an integer value and the converted grayscale values of R, G, and B in the RGB format are each a real-number value in the floating decimal point format. The grayscale values of R, G, and B may be values in the floating decimal point format or the like only when these values each have the number of significant figures with which the portion after the decimal point can be represented.

Figure 9:
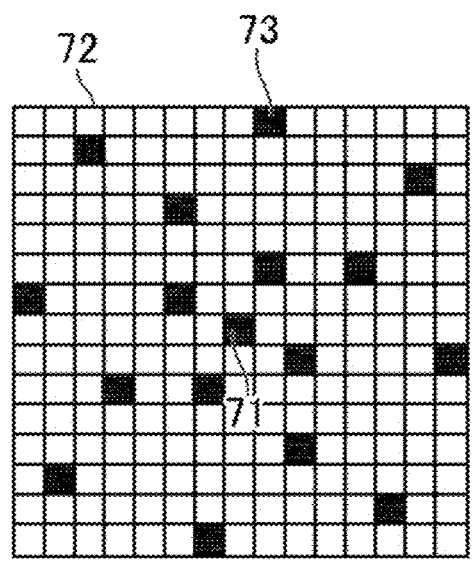
FIG. 9 is a diagram depicting an example of sampled pixels.

The evaluation value obtaining part 57 samples the plural pixels present in the noted area 72 (hereinafter, referred to as "neighboring pixels") (step S204). FIG. 9 is a diagram depicting an example of the sampled neighboring pixels 73. The neighboring pixels 73 are a portion of the pixels present in the noted area 72. In the example of FIG. 9, the number of the neighboring pixels 73 sampled for a certain target pixel 71 is 16, and these plural neighboring pixels 73 are each not adjacent to each other and are each distant from each other. The neighboring pixels 73 are the pixels to be used for the correction of the color of the target pixel 71. The calculation amount can be reduced preventing any degradation of the quality of the correction of the color by limiting the neighboring pixels 73 to be processed in the correction to pixels that are a part of the noted area 72 and that are each distant from each other.

The color space converting part 56 converts the values of Y, Cb, and Cr in the YUV format of the sampled neighboring pixels into the grayscale values of R, G, and B in the RGB format (step S205). In the present embodiment, the values of R, G, and B output by the color space converting part 56 are in the floating decimal point format similar to those at step S203 while these values may be in the fixed decimal point format or the like.

The evaluation value obtaining part 57 next selects new neighboring pixels to be processed from the sampled plural neighboring pixels (step S206). In addition, the process at step S206 may be integrated with the process at step S204. In this case, the arrangement of the relative positions of the neighboring pixels and the target pixel 71 is set in advance, and the evaluation value obtaining part 57 sequentially selects the arrangement and thereby selects one neighboring pixel present at the relative position presented by the arrangement. The color space converting part 56 converts the values of Y, Cb, and Cr in the YUV format of the selected neighboring pixel into the grayscale values of R, G, and B in the RGB format.

The evaluation value obtaining part 57 next calculates the distance of the color between the target pixel 71 and the selected neighboring pixel, and determines whether the distance is smaller than the determination threshold value (step S207). In the case where the evaluation value obtaining part 57 determines that the distance is larger than the determination threshold value (N of step S207), the evaluation value obtaining part 57 does not perform the processes at steps S208 and S209. In this case, in the present embodiment, the distance of the color is a what-is-called Chebyshev distance, and is the maximal value of the absolute value of the difference in the grayscale value between the target pixel 71 and the neighboring pixel for the component of each of R, G, and B. The distance of the color may be determined using another method like, for example, the Euler distance.

On the other hand, in the case where the evaluation value obtaining part 57 determines that the distance is equal to or smaller than the determination threshold value (Y of step S207), the evaluation value obtaining part 57 determines that the neighboring pixel belongs to a set N and, to determine the average of the grayscale values of R, G, and B of the neighboring pixel, adds the grayscale values of R, G, and B of the neighboring pixel respectively to variables ACC_R, ACC_G, and ACC_B (step S208).

The set N is a set of the pixels that may constitute the gradation. FIG. 10 is a diagram depicting an example of the set N of the pixels. FIG. 10 is a diagram corresponding to FIG. 9. In an example of FIG. 10, some pixels 74 of the neighboring pixels 73 belong to the set N and the remaining pixels 75 do not belong to the set N.

The evaluation value obtaining part 57 adds a score element that is based on the distance of the color between the neighboring pixel and the target pixel 71 to a variable sc (step S209). FIG. 11 is a diagram depicting an example of a table used in calculating the score. The evaluation value obtaining part 57 obtains the score element that corresponds to the distance of the color between the neighboring pixel and the target pixel 71 and adds the score element to the variable sc. As depicted in FIG. 11, the value of the score becomes higher as the distance of the color becomes smaller. In addition, in the present embodiment, the determination threshold value is 6 and no score element whose distance of the color is 7 or larger is therefore present in the table in FIG. 11. In addition, in the present embodiment, the variables ACC_R, ACC_G, and ACC_B, and the variable sc are each a real-number variable in the floating decimal point format and, at each of steps S208 and S209, the calculation is performed in the floating decimal point format to secure the precision. Furthermore, the variables ACC_R, ACC_G, and ACC_B, and the variable sc are initialized when the target pixel 71 is selected.

The evaluation value obtaining part 57 next determines whether all the neighboring pixels are already selected (step S210). In the case where the evaluation value obtaining part 57 determines that not all the neighboring pixels are selected (N of step S210), the evaluation value obtaining part 57 repeats the processes at and after step S206 and, in the case where the evaluation value obtaining part 57 determines that all the neighboring pixels are already selected, the evaluation value obtaining part 57 moves to the processes at and after step S211.

At step S211, the evaluation value obtaining part 57 determines whether or not the score (the value of the variable sc) formed by integrating the score elements is equal to or larger than a score threshold value. In the case where the evaluation value obtaining part 57 determines that the score is smaller than the score threshold value (N of step S211), the situation of the noted area 72 is that the variation of the color therein is rich and generation of any banding tends to be avoided, and the grayscale correcting part 58 therefore does not correct the color of the target pixel 71 (step S219).

On the other hand, in the case where the evaluation value obtaining part 57 determines that the score is larger than the score threshold value (Y of step S211), the situation of the noted area is that the variation of the color therein is poor and the any banding tends to be generated, and the grayscale correcting part 58 therefore performs the processes at steps from steps S212 to S218 to correct the target pixel 71.

At step S212, the grayscale correcting part 58 obtains a noise value to be attached to the target pixel 71. The noise value may be a pseudo random number that is a real number or may be obtained from an arrangement that is determined in advance and whose average becomes substantially zero when the arrangement is seen in a specific range thereof. This noise value is a noise value to be used for application of the dithering.

The grayscale correcting part 58 determines the average value of each of the grayscales of R, G, and B of the pixels belonging to the set N by dividing the integrated values of the grayscale values of R, G, and B (the variables ACC_R, ACC_G, and ACC_B) by the number of the pixels belonging to the set N (step S213). The grayscale correcting part 58 adds the noise value to the average value of each of the grayscales determined for each of R, G, and B, and obtains a reference color that includes the added R, G, and B components (step S214). In the present embodiment, the average value of the grayscale and the R, G, and B components of the reference color are each a real number in the floating decimal point format, similar to the grayscale value, and the calculation is also performed in the floating decimal point format. As far as not clearly described especially, the calculation described below is also performed in the floating decimal point format. In the above, in the case where no dithering is applied, the grayscale correcting part 58 may obtain the average values of the grayscales of R, G, and B of the pixels belonging to the set N as the reference color. In this case, the process relating to the noise is unnecessary.

The grayscale correcting part 58 determines a distance d between the reference color and the color of the target pixel 71 (step S215). The distance d is a what-is-called Chebyshev distance while the distance d may be another type of distance.

Concurrently with the calculation of the distance d, the evaluation value obtaining part 57 calculates an evaluation value F of the flatness on the basis of the score (step S216). The evaluation value obtaining part 57 obtains the evaluation value F of the flatness by computation represented by the following equation.

$$F = sc/\text{Max}sc \quad [\text{Math. 1}]$$

In the above, "sc" is a score, "Maxsc" is the theoretical maximal value of the score (in the present embodiment, the maximal value is 170 given by multiplying the number of the sampled points of 17 by the highest value of the score element of 10).

The grayscale correcting part 58 determines a blend coefficient "a" on the basis of the distance d and the evaluation value F (step S217). The blend coefficient "a" is determined in accordance with the following equations.

$$W1 = (F - Thsc/\text{Max}sc)/(1 - Thsc/\text{Max}sc)$$

$$W2 = \min(1.0, 2.0 - d/\text{Max}d)$$

$$a = W1 \times W2 \quad [\text{Math. 2}]$$

The blend coefficient "a" is a product of a weight W1 and a weight W2 and is a parameter representing the strength of the correction that diminishes the banding. W1 is a weight based on the evaluation value F, W2 is a weight based on the distance d, and both thereof are real number values. "min" represents a function that selects the minimal value of the two arguments. Thsc is the score threshold value.

FIG. 12 is a graph depicting an example of the relation between the evaluation value F of the flatness and the weight W1. In the present embodiment, the value of the weight W1 becomes 0 when the score is equal to the score threshold value, monotonically increases as the score increases, and becomes 1 when the score becomes Maxsc. In the case where the score is smaller than the score threshold value, the weight W1 is not calculated. In other words, the strength of the correction of the banding monotonically increases in accordance with the evaluation value F of the flatness of the color of the noted area 72. The evaluation value obtaining part 57 may directly determine W1 as the evaluation value F of the flatness.

FIG. 13 is a graph depicting an example of the relation between the distance d and the weight W2. In the present embodiment, the weight W2 becomes 0 when the distance d of the color is equal to the determination threshold value used at step S207 and becomes 1 when the distance d of the color is equal to or smaller than a value that is a half of the determination threshold value. The weight W2 monotonically decreases as the distance d of the color increases from the value that is a half of the determination threshold value.

When the blend coefficient a is determined, the grayscale correcting part 58 corrects the color of the target pixel 71 on the basis of the blend coefficient a, the reference color, and the color of the target pixel 71 (step S218). More specifically, the grayscale correcting part 58 determines the color of the target pixel 71 after the correction, by interpolating the R, G, and B components of the original color of the target pixel 71 and the R, G, and B components of the reference color such that the color of the target pixel 71 after the correction becomes similar to the original color of the target pixel 71 in the case where the blend coefficient a is 0, and the color of the target pixel 71 after the correction becomes the reference color in the case where the blend coefficient a is 1.

The grayscale correcting part 58 corrects the color of the target pixel 71 on the basis of not only the evaluation value F representing the flatness but also the difference between the grayscale values of the plural pixels present in the noted area 72 and the grayscale values of the target pixel 71, by using the blend coefficient a.

When it is determined that the color of the target pixel 71 is corrected or that no correction is to be performed for the color of the target pixel 71, the banding diminishing unit 53 determines whether all the target pixels 71 are already selected (step S220). In the case where the banding diminishing unit 53 determines that not all the target pixels 71 are selected, the banding diminishing unit 53 repeats the processes at and after step S201. On the other hand, in the case where the banding diminishing unit 53 determines that all the target pixels 71 are selected, the banding diminishing unit 53 moves to the next process. The image including the pixels processed as the target pixels 71 so far corresponds to the image that is corrected by the grayscale correcting part 58.

When the banding diminishing unit 53 corrects the image, the banding diminishing unit 53 outputs the image data of the intermediate image that is the image corrected in the processes performed therefor so far, to the memory (step S104). In the above, the banding diminishing unit 53 may convert the grayscale values of R, G, and B of each of the pixels included in the intermediate image into integer values and may output these integer values to the memory. The output destination of the image data may be a frame buffer memory or may be another memory directly accessible by the GPU.

The display processing unit 54 outputs a display signal that causes the display 21 to display thereon the image on the basis of the image data output to the memory (step S105).

More specifically, the display control circuit may read the image data that is stored in the frame buffer memory and may output the display signal, or the display processing unit 54 may process the image data of the intermediate image and the display control circuit may read the processed image data and may output the display signal.

The banding becomes inconspicuous by setting the color of each of the pixels to be the color of the average value of the colors of the noted area 72 centering this pixel. Furthermore, the banding can further be diminished by applying the dithering to the average value. On the other hand, when the above processing is performed for all the pixels, the difference in the grayscale present in the non-gradation area 81 and the difference in the grayscale between the non-gradation area 81 and the gradation area become unclear.

In the present invention, whether or not any banding tends to be generated is evaluated on the basis of the flatness of the color in the noted area 72 centering the target pixel 71, and the like, and only the color of each of the pixels included in an area for any banding to tend to be generated in is corrected. It can thereby be avoided that any difference in the grayscale to be originally present becomes unclear.

Figure 14:
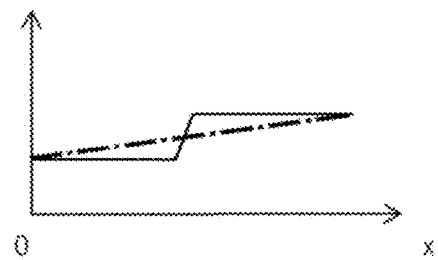
FIG. 14 is a graph schematically depicting an example of a grayscale before correction and the grayscale after the correction of pixels lined in a straight line.

FIG. 14 is a graph schematically depicting an example of grayscales before the correction and the grayscales after the correction of pixels lined in a straight line. The grayscale values of the pixels before the correction are depicted by a solid line and the grayscale values of the pixels after the correction are depicted by a dotted line. In the example in FIG. 14, variation of the grayscales of the pixels is small and the evaluation value F of the flatness is therefore high. The correction is therefore performed such that the correction causes the difference in the grayscales to disappear.

Figure 15:
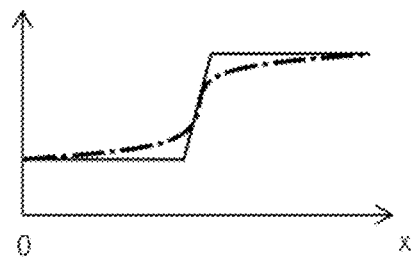
FIG. 15 is a graph schematically depicting another example of the grayscale before correction and the grayscale after the correction of the pixels lined in a straight line.

FIG. 15 is a graph schematically depicting another example of the grayscales before correction and the grayscales after the correction of the pixels lined in a straight line. In the example in FIG. 15, the difference in the grayscales of the pixels is at a degree not to be ineligible for the correction but is larger than that of the example in FIG. 14. In the example in FIG. 15, the grayscale values are corrected while the shape of the steps of the grayscales remains to some extent.

As above, any unnatural grayscale variation can be prevented from being generated in the vicinity of the border between the non-gradation area 81 and the gradation area, by continuously switching bringing close to the original color of the target pixel 71 and bringing close to the reference color therebetween in accordance with the evaluation value F of the flatness and the distance d between the target pixel 71 and the reference value.

In the present embodiment, the noise is attached as the dithering while the processing may be performed using another known approach. For example, instead of the process at step S214, an error diffusion method may be applied to the color of the target pixel 71, that is corrected at step S218 as the processing of the dithering in the broad sense.

The invention claimed is:

1. An image processing device comprising:
   image data obtaining means that obtains image data of an original image including a plurality of pixels;
   evaluation value obtaining means that obtains an evaluation value representing a possibility of generation of banding on a basis of a color distribution in a noted area including a target pixel that is any one of the plurality of pixels;
   correcting means that produces an intermediate image of which a color of the target pixel is corrected on a basis of the evaluation value; and
   image output means that causes a corrected image to be output on a basis of the produced intermediate image, wherein
   the correcting means varies a correction amount of the color of the target pixel in accordance with the evaluation value.

2. The image processing device according to claim 1, wherein
   the correcting means does not correct the color of the target pixel in a case where it is determined that a possibility of generation of any banding is low on a basis of a comparison between the evaluation value and a predetermined threshold value.

3. The image processing device according to claim 2, wherein
   the correcting means corrects the color of the target pixel in a case where it is determined that the possibility of generation of any banding is high on a basis of the comparison between the evaluation value and a predetermined threshold value.

4. The image processing device according to claim 3, wherein
   in a case where the correcting means corrects the color of the target pixel, the correcting means corrects a color of a target pixel such that a correction amount becomes large as a difference between the evaluation value and a predetermined threshold value becomes large.

5. The image processing device according to claim 1, wherein
   the evaluation value obtaining means obtains an evaluation value that represents flatness of grayscale values representing a color of the noted area.

6. The image processing device according to claim 1, wherein
   the correcting means corrects such that a grayscale value of the target pixel become close to an average of grayscale values of a plurality of pixels present in the noted area.

7. The image processing device according to claim 1, wherein
   the correcting means calculates the evaluation value on a basis of a difference between the average of grayscale values of a plurality of pixels present in the noted area and a grayscale value of the target pixel.

8. The image processing device according to claim 1, wherein
   the evaluation value obtaining means calculates the evaluation value on a basis of grayscale values of a plurality of pixels that are the plurality of pixels present in the noted area and that are each not adjacent to each other.

9. An image processing method comprising:
   obtaining image data of an original image including a plurality of pixels;
   obtaining an evaluation value that represents a possibility of generation of banding on a basis of a color distribution in a noted area including a target pixel that is any one of the plurality of pixels;
   producing an intermediate image of which a color of the target pixel is corrected, on a basis of the evaluation value; and
   causing a corrected image to be displayed on a basis of the produced intermediate image, wherein
   at the producing the intermediate image, a correction amount of the color of the target pixel is varied in accordance with the evaluation value.

10. A non-transitory computer readable medium having stored thereon a program for a computer, the program comprising:
- image data obtaining means that obtains image data of an original image including a plurality of pixels;
- evaluation value obtaining means that obtains an evaluation value representing a possibility of generation of banding on a basis of a color distribution in a noted area including a target pixel that is any one of the plurality of pixels;
- correcting means that produces an intermediate image of which a color of the target pixel is corrected, on a basis of the evaluation value; and
- image output means that causes a corrected image to be output on a basis of the produced intermediate image, wherein
- the correcting means varies a correction amount of the color of the target pixel in accordance with the evaluation value.

* * * * *